Sept. 1, 1953      I. M. WELLS      2,650,833
COUPLING DEVICE FOR VEHICLES
Filed June 26, 1952
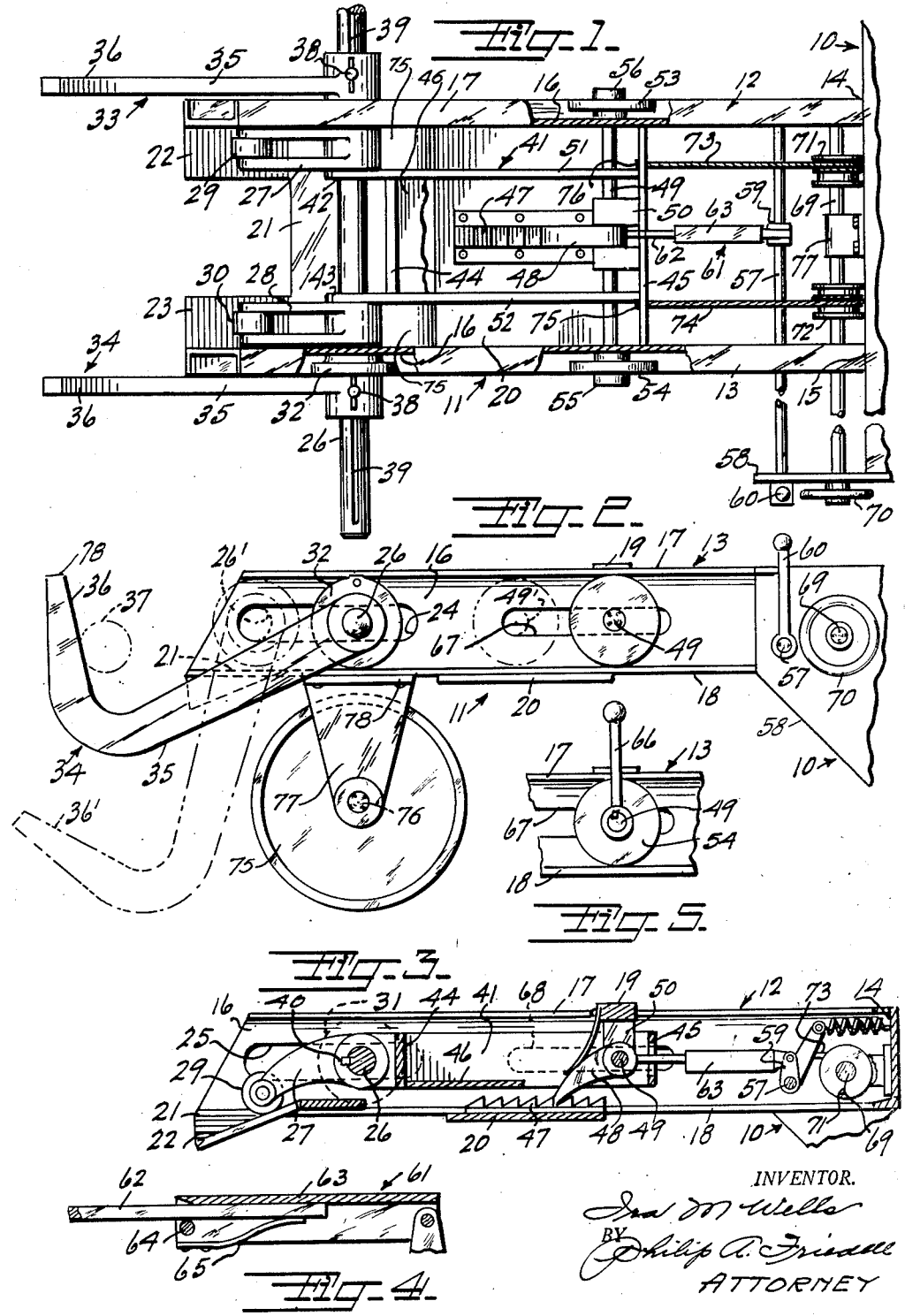
INVENTOR.
Ira M. Wells
BY Philip A. Friedell
ATTORNEY Patented Sept. 1, 1953

2,650,833

UNITED STATES PATENT OFFICE 2,650,833

COUPLING DEVICE FOR VEHICLES

Ira M. Wells, Oakland, Calif., assignor to Spears Wells Machinery Company, Incorporated, Oakland, Calif., a corporation of California Application June 26, 1952, Serial No. 295,650

9 Claims. (Cl. 280—33.44)

This invention relates to improvements in coupling devices for coupling trailer devices to tractive vehicles or tractors and is specifically designed for coupling aggregate spreaders or spreader boxes and similar road working devices to dump trucks and specifically for coupling to the rear axle, and one which can be coupled and uncoupled from a safe, remote point and which requires no special structures or attachments on the axle, and one which has two spaced coupling members which are adjustable as to lateral spacing to suit the specific axle to which it is to be coupled, for perfect alignment between the tractive vehicle and the trailing device.

When a spreader or similar device is used in road building or repair, it is important that the device be held in line with the tractive vehicle, and which can only be accomplished by the use of two coupling members when the coupling is made with a rear axle, with the coupling members adjustable as to spread so that they can be brought adjacent to the spring seats or other relatively fixed and equally laterally spaced elements on the axle.

To eliminate hazardous and inconvenient coupling to the rear axle of a tractive vehicle it is necessary that the coupling and uncoupling be carried out from a point of safety, and this invention provides a coupling device which is coupled to the rear axle by mere turning of a handwheel or crank on the side of the trailing vehicle, and uncoupled by a mere pull on a lever, which is also mounted on the side of the trailing vehicle. Thus it is unnecessary to crawl under the tractive vehicle or be positioned in some other hazardous location as is necessary with the majority of hitches or coupling devices, either for coupling or uncoupling.

Common practice in pavement or road construction is to haul paving or road materials such as crushed rock, gravel, crushed slag, bituminous mixes and the like from a source of supply to the construction zone in dump trucks. Upon arrival the dump truck is backed up to the spreader box, the spreader box is hitched to the dump truck, the tail gate is opened and the front of the truck body is elevated at the forward end to cause the material to flow into the spreader box. The truck travels at a low speed along the road construction path and the material flows through suitably controlled gates on the spreader box, depositing the material to a uniform width and a predetermined level and predetermined average thickness or depth. In this connection different makes and styles of trucks differ in rear axle and frame construction, in tire sizes, and in distance between spring or support saddles. This invention is particularly adapted to all such variations without any additions to or modifications of the truck or rear axle, as previously mentioned.

The objects and advantages of the invention are as follows:

First, to provide a coupling device for coupling a spreader box or the like to the rear axle of a tractive vehicle and which compensates for the elevation of the axle and is adjustable to the spacing of the body supports on the axle, for perfect alignment of the axis of the spreader box with that of the tractive vehicle.

Second, to provide a coupling device as outlined which is connectable and disconnectable from the axle of the tractive vehicle from a remote point of safety, thereby eliminating the hazard present when a coupling is manually connected to an axle of a vehicle.

Third, to provide a coupling device as outlined which requires no additions or modifications in the rear axle structure and which couples directly to any axle.

Fourth, to provide a coupling device as outlined which engages from underneath onto the front of the axle and which when released will drop to clear the axle.

Fifth, to provide a coupling device as outlined which is rigidly fixed to and projecting forwardly from the trailing vehicle and which is coupled to and released from the tractive vehicle axle through remote manual control.

Sixth, to provide a coupling device as outlined with vehicle wheels for support of the forward end of the trailing vehicle.

In describing the invention reference will be had to the accompanying drawings in which:

Fig. 1 is a top plan view of the invention with portions broken away to show hidden features.

Fig. 2 is a side elevation of Fig. 1.

Fig. 3 is a longitudinal sectional elevation through the invention.

Fig. 4 is an enlarged fragmentary sectional elevation through the coupling release.

Fig. 5 is a fragmentary elevation showing a modification of the coupling release.

The invention is particularly designed for use with a spreader box shown fragmentarily at 10 though it can be applied to any type of trailer with which it may prove suitable, and consists of a frame 11 which includes side members 12 and 13 the rearward ends of which are fixed to the spreader box at 14 and 15, these side members being preferably formed of structural channels having each a web 16 and flanges or legs 17 and 18 with the webs facing.

A top cross member 19 and a bottom cross member 20 maintain spacing between the side members and form a rigid structure. A cam plate 21 spans the forward ends of the side members and as shown includes two forwardly and downwardly inclined portions 22 and 23, though not limited to two since a single centrally located cam could be substituted if desired.

Extending through longitudinal slots 24 and 25 formed in the forward portions of the webs of the two side members is a coupling shaft 26 on which is fixedly secured two cam levers 27 and 28 each of which is provided with a roller as indicated at 29 and 30, though with a single cam only one of these arms with roller would be used.

Track wheels 31 and 32 are rotatable on the shaft and ride on and between the legs 17 and 18 of the respective channels, the wheels having diameters just clearing one leg when riding on the other.

Slidably and non-rotatably mounted on the respective outer portions of the shaft are the coupling hooks or arms 33 and 34 each consisting of a projecting arm 35 with an upwardly projecting hook portion 36 and which is formed substantially at right angles to the arm portion so as to clear or slide off the axle 37 of the vehicle when the coupling device is released, for which reason no more than slight concavity in the hook portions would be desirable. These arms are axially adjustable on the shaft so that they may be brought into contact with or adjacent to the spring saddles or body supports on the tractive vehicle to maintain central alignment between the tractive vehicle and the spreader box to insure accurate spreading of material along the path of the tractive vehicle. These coupling arms are secured in adjusted position by any suitable means such as by means of set screws 38 with keyways 39 and keys 40 maintaining the coupling arms against rotation on the shaft in any axially adjusted position.

An actuating frame 41 has its forward end supported by the coupling shaft 26 as indicated at 42 and 43 and is provided with cross members 44, 45 and 46 to provide suitable rigidity in the frame, with the rear cross member 45 functioning as centering means for the rear end, this member extending from each side of the frame to slidably cooperate with the webs of the channels as indicated, thus maintaining exact axial alignment of the frame with the shaft at right angles to the longitudinal axes of the vehicles.

Mounted on the cross member 20 on the main frame is a rack 47. A cooperative pawl 48 is supported on a pawl shaft 49 which is suitably supported in bearings 40 which are supported by the cross-member 45 and is rotatable in the rearward portions of the side members 51 and 52 of the actuating frame 41 with the shaft projecting beyond the side members and through the side channels 12 and 13 and having track wheels 53 and 54 rotatable on the respective ends thereof and being maintained by the collars 55 and 56, these wheels being of the same diameter as the wheels 31 and 32 and thereby supporting the shaft 49 which supports the rearward end of the actuating frame.

Mounted in spaced relation rearwardly of the actuating frame is a release shaft 57 which has bearing in one channel 12 and extends through the other channel 13 and through a plate 58 projecting from the side of the trailing vehicle or spreader box, and has a lever 59 fixed centrally between the channels, and another manually operative lever 60 fixed on the terminal end exteriorly of the plate 58. A telescopic connection 61 connects between the lever 59 and the pawl 48, and this telescopic member includes a plunger 62 which operates in a channel shape member 63, being maintained by a rocking pin 64 and spring 65 to permit normal operation of the pawl. With this arrangement manual control of the pawl for release is in the safest possible position, at one side of the widest portion of the trailing vehicle. However, if a simplified form is desired, the release lever 66 may be mounted on the end of shaft 49, which as will be noted, operates in slots 67 and 68 provided in the respective channels. With this latter arrangement the shaft with lever 66 moves forward when released, therefore the lever cannot readily be located exteriorly of the widest portion of the spreader box or trailing vehicle without building out a special supporting structure from the actuating frame.

Mounted rearwardly of the pawl release shaft is a retracting shaft 69 which has bearing in both channels and extends beyond one channel and through the plate 58 with a manually operative device such as a handwheel 70 fixed on the terminal end, and has the take-up drums 71 and 72 mounted thereon between the channels 12 and 13, with cables 73 and 74 connected to the actuating frame as indicated at 75 and 76 and operating about the drums 71 and 72. A suitable bearing 77 is provided in lieu of a particularly heavy shaft which might be required to withstand the tractive resistance of the spreader box.

Normally the coupling arms 33 and 34 are in the lowered positions indicated at 36' with the actuating frame in its most forward position with the shafts 26 and 49 at the forward ends of the slots 24 and 67 as indicated at 26' and 49', the tips 78 of the coupling arms well clearing the axle or axle housing 37.

The tractive vehicle or truck is backed up to the position indicated by the axle 37. The handwheel 70 is manually operated to draw the actuating frame back through the medium of the drums 71 and 72 and cables 73 and 74, the rollers 29 and 30 riding up the inclines 22 and 23 and turning the shaft 26 to raise the coupling arms to the position shown in solid lines, the pawl 48 clicking over the teeth of the rack and engaging when the coupling arms have been raised to proper engaging position. The arms are next adjusted on the shaft 26 axially to engage or some close to, the inner faces of the spring saddles or body supports on the rear axle for maintaining alignment of the trailing vehicle or spreader box.

The forward end of the coupling device is suitably vehicularly supported as indicated by the wheel 75 which is supported on shaft 76 which is rotatable in drop bearings 77 which in turn are mounted on the side members 12 and 13 as indicated at 78. Obviously either one or two wheels may be used as may prove most desirable.

In the case of a dump truck and spreader box, the tail gate of the dump truck is opened and the body elevated for dumping into the spreader box, feeding the materials as the material is distributed from the spreader box.

When all of the material has been distributed, the spreader box is instantly releasable by manually pressing the lever 60 forward, or by pulling back on lever 66, depending on which one is installed. This operation raises the pawl, allowing the actuating frame to freely move forward, releasing the coupling arms which drop to the position 36'.

Thus it is unnecessary to provide any attachments on the axle or axle housing, it is unnecessary for anyone to crawl under the rear of the truck to make the coupling, the coupling and releasing being carried out from the safest possible position, exteriorly of the side of the spreader box.

I claim:

1. Means for coupling a spreader box to a dump truck having an axle comprising, a main frame projecting forwardly from the spreader box, a coupling shaft supported by said main frame, coupling arms axially adjustable and non-rotatable on the respective ends of said coupling shaft and means for securing said arms in adjusted position with said arms normally dependent and clearing the underside of the axle of the truck, manually operable means for operating said coupling shaft to raise said coupling arms to engage the axle frontally from beneath, and means for locking said arms in raised coupling position, and manually operable means for releasing said locking means at will for instant uncoupling of the spreader box from the axle, said frame including side members having longitudinal slots for reciprocal movements of said coupling shaft, and cam levers fixed on said coupling shaft, and a cross member spanning said side members and having downwardly inclined cam surfaces for cooperation with said cam levers for operating said coupling shaft to raise said coupling arms when said coupling shaft is retracted through the medium of said manually operable means for operating.

2. A structure as defined in claim 1; a second cross member for said main frame and having a rack mounted thereon, an actuating frame supported by said coupling shaft, and a pawl carried by said actuating frame for engaging said rack and comprising said means for locking said arms in raised coupling position, with said manually operable means for releasing said locking means at will comprising a manually operable lever having an operative connection with said pawl for disengaging said pawl from said rack at will.

3. Means for coupling a spreader box to a dump truck having an axle comprising, a main frame fixed to and projecting forwardly from the spreader box, a pair of coupling arms carried by the forward end of said main frame and normally disposed in a dependent position, manually controlled and operable means for raising said coupling arms to engage the front of said axle from beneath, locking means for locking said arms in raised position, and manually operable means cooperative with said locking means for releasing said locking means at will for freeing said coupling arms to drop to normal position for uncoupling the spreader box from the dump truck; said main frame including side members, an actuating frame movable longitudinally within said main frame, a coupling shaft operating through longitudinal slots provided in the forward end of said main frame and supporting the forward end of said actuating frame, with said coupling arms axially adjustably and non-rotatably mounted on the respective ends of said coupling shaft, a cam lever fixed on said coupling shaft, and a forwardly and downwardly inclined cam surface cooperative with said cam lever, said manually controlled and operable means having connection with said actuating frame for retracting said frame to cause said cam lever to raise said coupling arms through retraction of said actuating frame.

4. Means for coupling a spreader box to the axle of a dump truck comprising a main frame fixed to and projecting from the front of said spreader box and including spaced side members, a front and an intermediate bottom cross member and a top cross member, a first longitudinal slot formed in the forward portion of each side member, a coupling shaft operating through said first slots and projecting beyond said side members, a normally dependent coupling arm axially adjustably and non-rotatably mounted on each end of said coupling shaft, a forwardly and downwardly inclined cam surface provided on said front bottom cross member, a lever fixed on said coupling shaft and having a roller cooperative with said cam surface, manually operable retracting means cooperatively connected with said shaft for retracting said shaft for raising said arms through cooperation of said roller with said cam surface, for engaging the axle frontally from beneath, and releasable locking means cooperative with said retracting means for locking said arms in raised coupling position.

5. A structure as defined in claim 4; manually operable releasing means cooperative with said locking means for releasing said locking means for freeing said coupling arms to gravitationally uncouple, at will.

6. A structure as defined in claim 4; said manually operable retracting means comprising, an actuating frame having its forward end supported by said coupling shaft, a second longitudinal slot formed intermediate the length of each side member, a pawl shaft extending through said second slot and a pawl fixed on said pawl shaft and a cooperative rack mounted on said intermediate cross member, with the other end of said actuating frame supported by said pawl shaft, said manually operable retracting means including a retracting shaft supported by said side members and extending beyond one side of said spreader box and terminating in a hand operable element, for safe operation of the means for coupling said retracting shaft including cable drums and cables connecting said actuating frame with said drums.

7. Means for coupling a spreader box to a dump truck or the like comprising, a main frame including two spaced channels having webs and legs with their webs facing, and having front and intermediate bottom cross members and a top cross member, and a first longitudinal slot formed in the forward end of each web, and a second longitudinal slot formed in the intermediate portion of each web, the rearward ends of said channels being fixed to the forward end of said spreader box, a coupling shaft passing through said first slots, a track wheel on each end of said coupling shaft and respectively operating between the legs of the respective channels for support of said coupling shaft, a substantially right-angled coupling arm mounted on each end of said coupling shaft and axially adjustable thereon and normally disposed in a dependent position, the forward portion of said front cross member having forwardly and downwardly inclined cam surfaces, cam levers having rollers and being fixed on said coupling shaft with said rollers cooperative with said cam surfaces, and manually operable retracting means having connection with said coupling shaft for raising said coupling arms to engage the front of the axle of the truck from beneath through the medium of said rollers riding up said cam surfaces when said coupling shaft is retracted.

8. A structure as defined in claim 7, means for locking said coupling shaft in retracted position comprising a rack mounted on said intermediate cross member, a locking shaft operating through said second slots and having a track wheel rotatable on each end and operating between the legs of the respective channels, a pawl fixed on said locking shaft and coöperative with said rack, an actuating frame having one end supported by said coupling shaft and the other end supported by said locking shaft, with said manually operable means having connection with said coupling shaft through said actuating frame, and manually operable means for releasing said pawl at will.

9. A structure as defined in claim 8; said manually operable retracting means comprising a retracting shaft having bearings in said webs at the rearward end and extending through said webs and terminating in a hand operable element, flexible members connecting said retracting shaft with said actuating frame for retraction through rotation of the retracting shaft; said manually operable means for releasing comprising a releasing shaft having connection with said pawl and rotatably mounted in said webs and extending therethrough, said retracting and releasing shafts extending in one direction to a point exteriorly of one side of the spreader box and each having a hand operable member thereon for remote control of coupling and uncoupling from a position of complete safety.

IRA M. WELLS.

References Cited in the file of this patent

UNITED STATES PATENTS

| Number | Name | Date |
|---|---|---|
| 1,851,349 | Cowles | Mar. 29, 1932 |
| 1,902,212 | Bonge | Mar. 21, 1933 |
| 2,117,562 | Marsch | May 17, 1938 |
| 2,119,263 | Baumgardner | May 31, 1938 |
| 2,403,820 | Miller | July 9, 1946 |
| 2,500,064 | Foster | Mar. 7, 1950 |

FOREIGN PATENTS

| Number | Country | Date |
|---|---|---|
| 461,675 | Germany | June 26, 1928 |